US012714615B2

(12) United States Patent
Ytterström et al.

(10) Patent No.: US 12,714,615 B2
(45) Date of Patent: Aug. 25, 2026

(54) KNEE SUPPORT ASSEMBLY FOR A WHEELCHAIR

(71) Applicants: PERMOBIL AB, Timrå (SE); PERMOBIL, INC., Lebanon, TN (US)

(72) Inventors: Niklas Ytterström, Sundsvall (SE); Duane Niemeyer, Aviston, IL (US); Howard Winn, Milwaukee, WI (US); Craig Culver, Neosho, WI (US)

(73) Assignees: PERMOBIL AB, Sundsvall (SE); PERMOBIL, INC., Lebanon, TN (US)

( * ) Notice: Subject to any disclaimer, the term of this patent is extended or adjusted under 35 U.S.C. 154(b) by 212 days.

(21) Appl. No.: 18/632,670

(22) Filed: Apr. 11, 2024

(65) Prior Publication Data

US 2024/0342026 A1 Oct. 17, 2024

Related U.S. Application Data

(60) Provisional application No. 63/495,750, filed on Apr. 12, 2023.

(30) Foreign Application Priority Data

Apr. 11, 2023 (EP) .................................... 23167279

(51) Int. Cl.
*A61G 5/12* (2006.01)

(52) U.S. Cl.
CPC .................................. *A61G 5/127* (2016.11)

(58) Field of Classification Search
CPC .......... A61G 5/127; A47C 7/50; A47C 7/503; A47C 7/52
See application file for complete search history.

(56) References Cited

U.S. PATENT DOCUMENTS 4,487,200 A * 12/1984 Feanny ................ A61F 5/0125 602/26
5,713,591 A * 2/1998 Zarkhin ................ A61G 5/127 280/291
6,601,869 B2 8/2003 Porcheron
7,806,842 B2 * 10/2010 Stevenson ............ A61F 5/0125 602/5

(Continued)

FOREIGN PATENT DOCUMENTS

CN 106667682 A 5/2017
CN 107137207 A * 9/2017 ........... B25J 9/0006

(Continued)

OTHER PUBLICATIONS

International Search Report and Written Opinion for Application No. PCT/US2024/024027 dated Jun. 19, 2024 (13 pages).

*Primary Examiner* — Joseph W Sanderson
(74) *Attorney, Agent, or Firm* — Michael Best & Friedrich LLP

(57) ABSTRACT

A knee support assembly for a wheelchair includes a knee support configured to be mounted to the wheelchair, the knee support including a flexible harness connected to and pivotably suspended between a first harness holder and a second harness holder, wherein the flexible harness includes a first strap, a second strap, and a substrate, the first strap is selectively fastened to the substrate, and the second strap is selectively fastened to the substrate, the first strap and the second strap each being configure to slide relative to substrate.

20 Claims, 10 Drawing Sheets

(56) References Cited

U.S. PATENT DOCUMENTS

| | | | | |
|---|---|---|---|---|
| 8,104,835 | B2 * | 1/2012 | Ovre | A61G 5/127<br>297/DIG. 10 |
| 8,690,812 | B2 * | 4/2014 | Moir | A61F 5/0123<br>602/26 |
| 8,967,715 | B2 * | 3/2015 | Carpenter | B60N 2/2866<br>297/253 |
| 10,188,539 | B2 * | 1/2019 | Garrish | A61F 5/0125 |
| 10,306,991 | B2 * | 6/2019 | Behlen | A47C 7/52 |
| 10,874,539 | B2 * | 12/2020 | LeCursi | B33Y 80/00 |
| 10,898,364 | B2 * | 1/2021 | Garrish | A61F 5/0125 |
| 11,517,462 | B2 * | 12/2022 | Gildersleeve | A43B 7/14 |
| 2008/0249448 | A1 * | 10/2008 | Stevenson | A61F 5/0125<br>602/5 |
| 2010/0007180 | A1 * | 1/2010 | Ovre | A61G 5/127<br>297/354.1 |
| 2013/0178771 | A1 * | 7/2013 | Moir | A61F 5/0123<br>602/16 |
| 2017/0325593 | A1 * | 11/2017 | Behlen | A47C 7/52 |
| 2018/0318122 | A1 * | 11/2018 | LeCursi | A61B 5/1077 |
| 2019/0069614 | A1 * | 3/2019 | Feltner | A41D 13/065 |
| 2019/0133806 | A1 * | 5/2019 | Garrish | A61F 5/0125 |
| 2019/0254853 | A1 * | 8/2019 | Gildersleeve | A61F 5/0111 |
| 2021/0161742 | A1 | 6/2021 | Weiss et al. | |

FOREIGN PATENT DOCUMENTS

| | | | | |
|---|---|---|---|---|
| EP | 3078362 | A1 * | 10/2016 | A63B 21/005 |
| FR | 2661088 | A1 | 10/1991 | |
| FR | 2965718 | A1 * | 4/2012 | A61G 5/128 |
| WO | WO-2016001451 | A1 * | 1/2016 | B62K 11/007 |

* cited by examiner

KNEE SUPPORT ASSEMBLY FOR A WHEELCHAIR

CROSS-REFERENCE TO RELATED APPLICATIONS

The present application claims priority to European Patent Application No. EP 23167279.1, which was filed on Apr. 11, 2023 and entitled KNEE SUPPORT ASSEMBLY FOR A WHEELCHAIR, and to U.S. Provisional Patent Application No. 63/495,750, which was filed on Apr. 12, 2023 and entitled KNEE SUPPORT ASSEMBLY FOR A WHEELCHAIR, the contents of each application is hereby incorporated by reference in its entirety.

FIELD

The present disclosure relates to a wheelchair. More specifically, the present disclosure relates to an adjustable knee support assembly for a wheelchair.

BACKGROUND

Wheelchairs may be equipped with knee supports to support the knees and lower legs of the user. This is useful both when the user sits in the wheelchair and in case the user attains a standing position in a wheelchair with vertical stand capability. Keeping the knees/legs supported and in position, and thereby keeping the user's lower body in position, has a beneficial impact to a user's general posture and well-being, both in sitting, standing and forward tilt positions.

US 2021/0161742 A1 discloses a knee support system to be incorporated within a mobility apparatus. The knee support system comprises at least two oppositely positioned knee supports configured to be connected to members of the mobility apparatus, wherein the knee supports have a disengaged position in which the knee supports are laterally rotated and an engaged position in which the knee supports are harnessing legs of a user.

The solution disclosed in US 2021/0161742 A1 does not appear simple to engage and unlock, especially for users with certain physical impairments. Moreover, the seat becomes significantly wider when the knee supports are rotated laterally. Additionally, while the knee supports do have padding over the rigid brackets, if the padding eventually wears down or becomes compressed and thereby hardened, this may result in poor performance and significant discomfort to the user.

SUMMARY

A general object of the present disclosure is to provide a knee support assembly for a wheelchair which solves or at least mitigates the problems of the prior art.

There is hence according to a first aspect of the present disclosure provided a knee support assembly for a wheelchair, comprising: a knee support comprising: a base bracket assembly configured to be mounted to a wheelchair, a first harness holder having a lower portion connected to the base bracket assembly at a first lateral side of the base bracket assembly, a second harness holder having a lower portion connected to the base bracket assembly at a second lateral side of the base bracket assembly, a flexible harness connected to and extending between the first harness holder and the second harness holder, wherein the flexible harness is arranged to provide knee support, wherein at least one of the first harness holder and the second harness holder is releasably connected to the base bracket assembly, to enable moving the flexible harness to the side relative to the base bracket assembly and thereby allow placement or removal of a leg between the base bracket assembly and the flexible harness.

The flexible harness provides less load on the user's knee and upper portion of its lower leg due to its mechanical flexibility and it being arranged in a suspended state. The harness structure also makes the flexible harness easy to fold to the side when a user transfers into or out of the wheelchair or simply desires to release the knee support assembly. Moreover, the flexible harness provides self-alignment towards the knee and lower leg because of the harness type design and is easier to handle due to its lower weight.

According to one embodiment the knee support is a first knee support and the knee support assembly comprises a second knee support comprising: a base bracket assembly configured to be mounted to a wheelchair, a first harness holder having a lower portion connected to the base bracket assembly at a first lateral side of the base bracket assembly, a second harness holder having a lower portion connected to the base bracket assembly at a second lateral side of the base bracket assembly, a flexible harness connected to and extending between the first harness holder and the second harness holder, wherein the flexible harness is arranged to provide knee support, wherein at least one of the first harness holder and the second harness holder is releasably connected to the base bracket assembly, to enable moving the flexible harness to the side relative to the base bracket assembly and thereby allow placement or removal of a leg between the base bracket assembly and the flexible harness.

The base bracket assembly of the first knee support and the second knee support may be two different base bracket assemblies, or they may be a single common base bracket assembly. Additionally, the first and second harness holder may be connected to a single member of the base bracket assembly, or to separate members of the base bracket assembly.

According to one embodiment the first knee support is a right knee support, and the second knee support is a left knee support.

According to one embodiment for each of the right knee support and the left knee support, the first harness holder is an outer harness holder, and the second harness holder is an inner harness holder.

According to one embodiment each inner harness holder is releasably connected to the respective base bracket assembly.

According to one embodiment for each of the first and the second knee support, both the first harness holder and the second harness holder is releasably connected to the respective base bracket assembly.

According to one embodiment for each knee support, the at least one of the first harness holder and the second harness holder that is releasably connected to the base bracket assembly comprises a locking mechanism configured to releasably lock said harness holder to the base bracket assembly.

According to one embodiment the locking mechanism comprises a spring-loaded element configured to engage with the base bracket assembly, and a release member configured to disengage the spring-loaded element from the base bracket assembly base bracket assembly. The knee support may thus be secured and unsecured with reduced effort by the user.

According to one embodiment the spring-loaded element is a pivotable element urged to pivot into engagement with the base bracket assembly by spring tension.

According to one embodiment for each knee support the flexible harness comprises a user-adjustable adjustment system configured to adjust a size and/or a tightness of the flexible harness.

According to one embodiment the adjustment system comprises an external knob, and a wire connected to the external knob and arranged inside the flexible harness, wherein the external knob is configured to adjust the length of the wire by rotation, a push, or a pull of the external knob, causing an adjustment of a distance between opposite ends of the flexible harness, configured to be connected to a respective one of the first harness holder and the second harness holder, thereby adjusting the tightness of the flexible harness.

According to one embodiment the adjustment system comprises a connection strap comprising a first strap piece and a second strap piece, each strap piece being configured to be connected to a respective one of the first harness holder and the second harness holder, wherein one of the strap pieces is configured to slide axially relative to the other strap piece, and wherein the adjustment system comprises a main strap connecting and extending between the first and the second strap piece, the main strap having an excess length relative to a minimum distance between the first strap piece and the second strap piece, wherein the first strap piece is connected to the external knob and the main strap is connected to the wire, and wherein the length of the wire determines a distance between the two strap pieces, and thereby the distance between the opposite ends of the flexible harness.

According to one embodiment the flexible harness comprises a substrate provided with a slot in which the said strap piece of the connection strap.

According to one embodiment the adjustment system comprises a binding system or a tightening strap for adjustment of the size or tightness of the flexible harness.

According to one embodiment the adjustment system is a fine adjustment system providing fine adjustment of the distance, and wherein the knee support assembly comprises a coarse adjustment system providing coarse adjustment of the distance.

According to each flexible harness is pivotally connected to first harness holder and to the second harness holder. Thus, each flexible harness becomes self-aligning/self-adjusting and therefore provides relatively equal pressure across the skin surface through pivoting motion.

According to one example each flexible harness is padded.

According to one example each flexible harness has an outer cover, and a padding underneath the outer cover. The padding is configured to accommodate a user's knee and/or lower leg in a desirable soft and resilient and thereby comfortable manner. In another example, the outer cover itself is configured to provide the desired comfortability by adapting its thickness and resilience.

There is according to a second aspect of the present disclosure provided a wheelchair comprising a knee support assembly of the first aspect.

One embodiment comprises a leg rest assembly, wherein each base bracket assembly is mounted to the leg rest assembly.

According to one embodiment the wheelchair comprises a seating system with forward tilt and/or standing capability. Alternatively, the wheelchair may have a seating system without tilting or standing capability.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
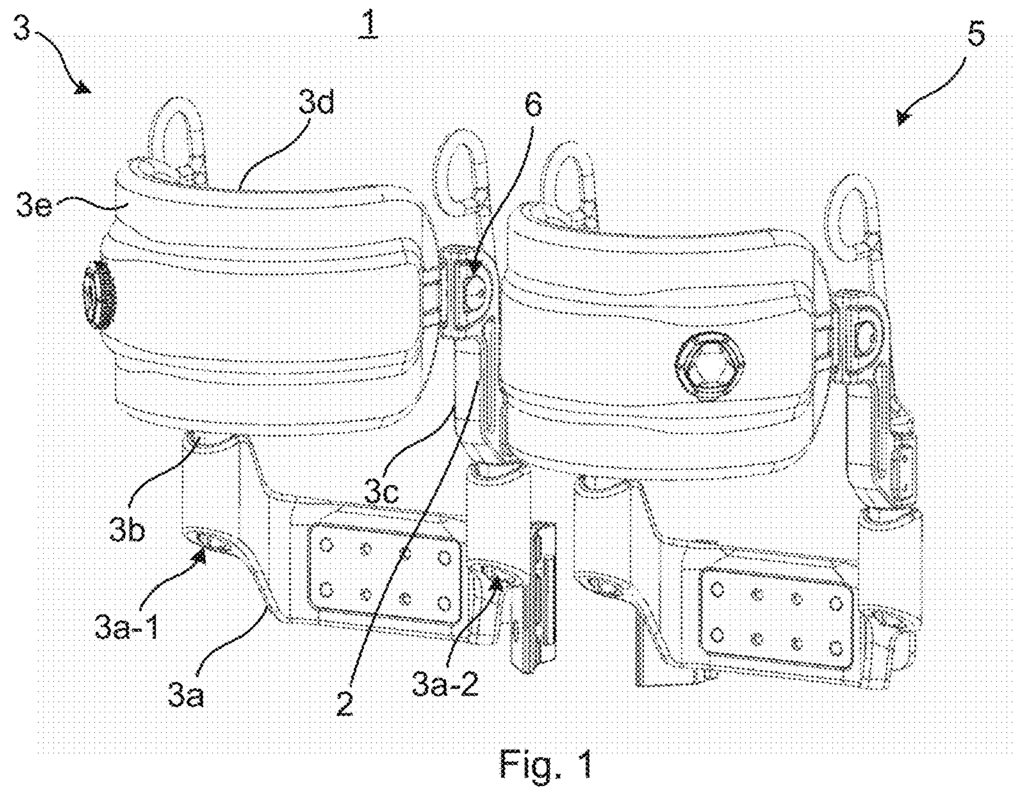
FIG. 1 shows a perspective view of an example of a knee support assembly for a wheelchair.

FIG. 1 depicts a knee support assembly 1. The knee support assembly 1 is configured to be mounted to a wheelchair, for example to a leg rest assembly or to the chassis of a wheelchair.

The knee support assembly 1 comprises a first knee support 3 and a second knee support 5. Each of the first knee support 3 and the second knee support 5 is arranged to support a respective knee and/or an upper portion of the lower leg of a user.

The first knee support 3 comprises a base bracket assembly 3*a*. The base bracket assembly 3*a* is configured to be mounted to a wheelchair, such as to a leg rest assembly of a wheelchair.

The first knee support 3 comprises a first harness holder 3*b* and a second harness holder 3*c*. Each of the first harness holder 3*b* and the second harness holder 3*c* may have an elongated structure, but other shapes are also contemplated.

The first harness holder 3*b* and the second harness holder 3*c* may have a respective lower portion that is connected to the base bracket assembly 3*a*.

According to one example, at least one of the first harness holder 3*b* and the second harness holder 3*c* is releasably connected to the base bracket assembly 3*a*. According to one example both the first harness holder 3*b* and the second harness holder 3*c* are releasably connected to the base bracket assembly 3*a*.

According to the example, the base bracket assembly 3*a* has two openings 3*a*-1 and 3*a*-2. Each opening 3*a*-1 and 3*a*-2 is configured to receive the lower portion of a respective one of the first harness holder 3*b* and the second harness holder 3*c*.

The openings 3*a*-1 and 3*a*-2 are arranged at a respective one of a first lateral side and a second lateral side of the base bracket assembly 3*a*.

Each of the first harness holder 3*b* and the second harness holder 3*c* comprises a respective harness connector arm 2. Each harness connector arm 2 extends from the base bracket assembly 3*a*, 5*a* when the harness holders 3*b*, 3*c* are connected to the base bracket assembly 3*a*.

The first knee support 3 comprises a flexible harness 3*d*. The flexible harness 3*d* is connected to and extends between the first harness holder 3*b* and the second harness holder 3*c*. The flexible harness 3*d* is suspended between the first harness holder 3*b* and the second harness holder 3*c*. The flexible harness 3*d* is connected to and suspended between the two harness connector arms 2.

The flexible harness 3*d* is pivotally connected, or configured to be pivotally connected, to the first harness holder 3*b* and to the second harness holder 3*c*. There is a pivot connection 6 between each end of the flexible harness 3*d* and a respective one of the first harness holder 3*b* and the second harness holder 3*c*. The flexible harness 3*d* is thus pivotable relative to the first harness holder 3*b* and the second harness holder 3*c*, as shown by arrows C in FIG. 2. The flexible harness 3*d* is arranged to support the knee and/or an upper portion of the lower leg of a user.

The flexible harness 3*d* may be padded. For example, the flexible harness 3*d* may have an outer cover 3*e* and a foam filling arranged inside the outer cover 3*e*. In other examples, the flexible harness 3*d* may have a thicker outer cover providing the desired padding structure, or the flexible harness 3*d* may be provided without padding. The cover 3*e* can be formed of neoprene, or a neoprene core with a nylon woven fabric bonded on both sides.

The flexible harness 3*d* may be configured to enable adjustment of its size or tightness. This is typically done after the user has placed a knee between the base bracket assembly 3*a* and the flexible harness 3*d* to make the flexible harness 3*d* fit tightly to the user's anatomy but could alternatively be done before the user places the knee/legs between the base bracket assembly 3*a* and the flexible harness 3*d*, especially if the flexible harness 3*d* is arranged to provide coarse adjustment of the size or tightness.

The second knee support 5 has the same structure as the first knee support 3. However, according to one example, the base bracket assembly may be shared by the four harness holders 3*b*, 3*c*, 5*b*, 5*c*, i.e., the knee support assembly may comprise a single base bracket assembly common to all four harness holders 3*b*, 3*c*, 5*b*, 5*c*.

Figure 2:
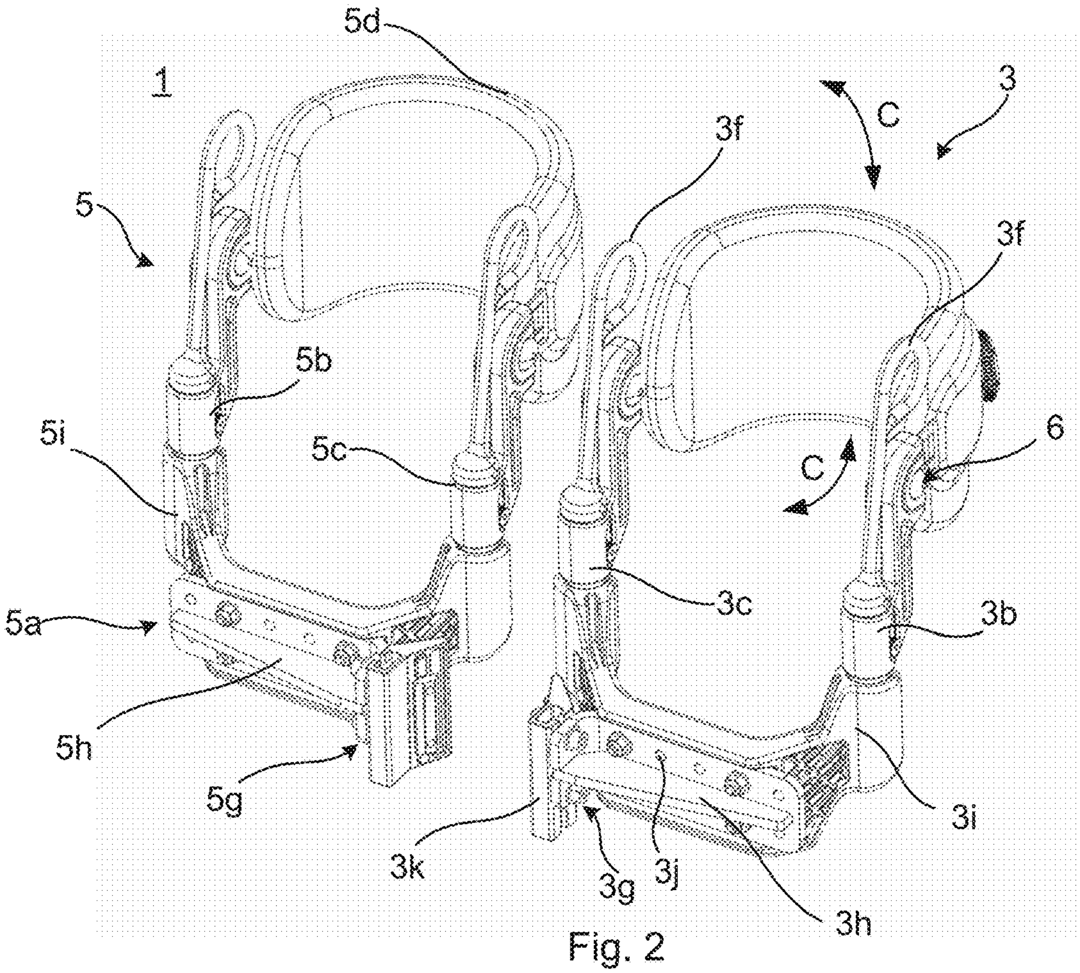
FIG. 2 shows a perspective view of the knee support assembly in FIG. 1 from the rear.

FIG. 2 shows a rear perspective view of the knee support assembly 1. The first knee support 3 is a right knee support and the second knee support 5 is a left knee support. The two second harness holders 3*c* and 5*c* are inner harness holders, arranged adjacent to each other. The two first harness holders 3*b* and 5*b* are outer harness holders. Hereto, the first harness holder 3*b* is arranged laterally outside the second harness holder 3*c* and the first harness holder 5*b* is arranged laterally outside the second harness holder 5*c*.

Each base bracket assembly 3*a* and 5*a* may comprise a bracket structure 3*h*, 5*h*, which can be connected to e.g., a leg rest assembly, and a base 3*i*, 5*i* attached to the bracket structure 3*h*, 5*h*. The first harness holder 3*b* and the second harness holder 3*c* is connected to the base 3*i*.

The lateral positioning of the base 3*i*, 5*i* relative to corresponding bracket structure 3*h*, 5*h* may according to one example be adjusted. Each bracket structure 3*h*, 5*h* may for example comprise a plurality of openings 3*j*, for screws or bolts, horizontally aligned arranged one after the other in a direction from the first harness holder to 3*b* to the second harness holder 3*c*. The base 3*i*, 5*i* may comprise openings which can be aligned with selected openings 3*j* for attachment of the base 3*i*, 5*i* to the bracket structure 3*h*, 5*h* at a desired position in the lateral direction.

Each base bracket assembly 3*a* and 5*a* may be height adjustable. Hereto, each base bracket assembly 3*a* and 5*a* may have a height adjustment mechanism 3*g*, 5*g*. The height adjustment mechanism 3*g*, 5*g* may for example comprise a rail structure 3*k* configured to be mounted fixed to e.g., a leg rest assembly 27, shown in FIG. 13, of a wheelchair, and to the bracket structure 3*h*, 5*h*. The bracket structure 3*h*, 5*h* may be configured to run vertically along the rail structure 3*k*. The bracket structure 5*h* may be fixated e.g., by screws or bolts to the rail structure 3*k* at a desired height. As an alternative, the rail structure may be provided on the leg rest assembly 27, with a bracket structure 3*h*, 5*h* mounted directly thereto.

At least one of the first harness holder 3*b*, 5*b* and the second harness holder 3*c*, 5*c* of each knee support 3, 5 may comprise a release member 3*f*. The release member will in the following be exemplified by pulling handle 3*f* that can be gripped by a user, and which is configured to be pulled along a longitudinal axis of the harness holder in question. According to the example shown in FIG. 2, both the first harness holder 3*b* and the second harness holder 3*c* are provided with a respective pulling handle 3*f*. By pulling the pulling handle 3*f* of the first harness holder 3*b*, the first harness holder 3*b* can be released from the base bracket assembly 3*a*. Similarly, by pulling the pulling handle 3*f* of the second harness holder 3*c*, the second harness holder 3*c* can be released from the base bracket assembly 3*a*. When one of the harness holders 3*b*, 3*c* has been released from the base bracket assembly 3*a*, the flexible harness 3*d*, 5*d* may be moved or folded to the side to enable a user to remove their knee or place their knee in a knee support 3, 5.

Figure 3:
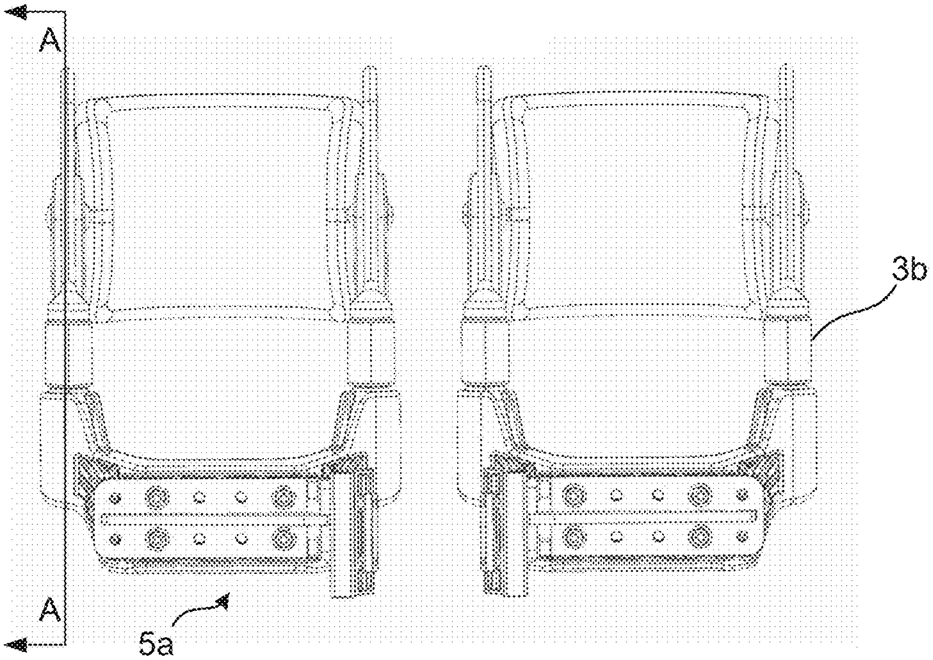
FIG. 3 is a rear view of the knee support assembly in FIG. 1.
Figure 4:
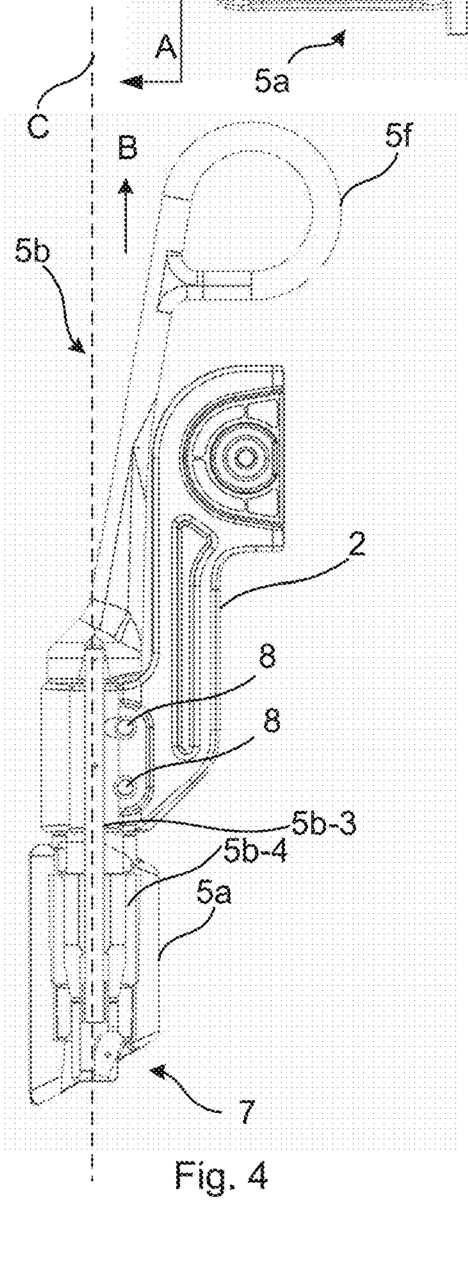
FIG. 4 depicts a sectional view along lines A-A in FIG. 3.

FIG. 3 shows a rear view of the knee support assembly 1. FIG. 4 shows a cross-section along lines A-A in FIG. 3. The cross-section thus shows the first harness holder 5*b* arranged in the base bracket assembly 5*a* of the second knee support 5. This configuration may according to one example apply to all the harness holders 3*b*, 3*c*, 5*b*, 5*c*.

Figure 5:
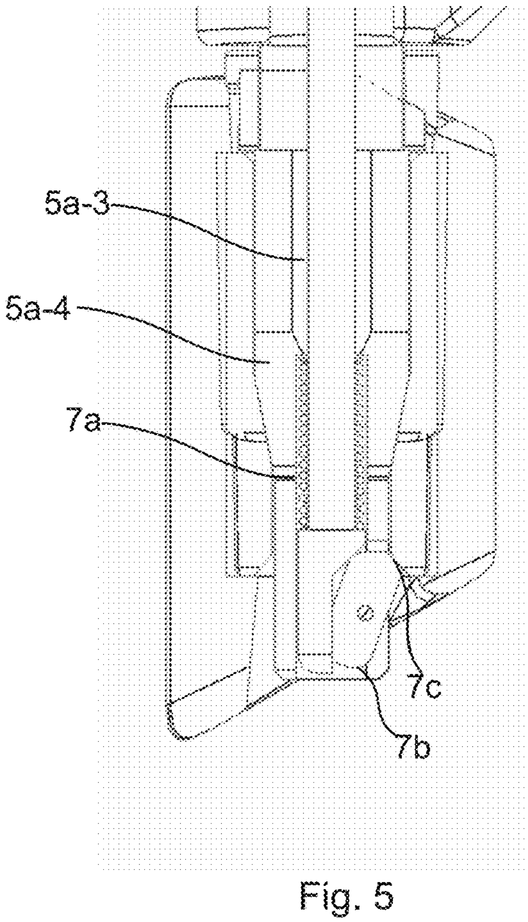
FIG. 5 is a close-up view of a portion of the sectional view in FIG. 4.

FIG. 4 depicts an example of the first harness holder 5*b* which is releasably connected to the base bracket assembly 5*a*. The first harness holder 5*b* comprises a locking mechanism 7 configured to releasably lock the first harness holder 5*b* to the base bracket assembly 5*a*. The first harness holder 5*b* has an inner rod 5*b*-3 and an outer stem 5*b*-4 arranged around the inner rod 5*b*-3. The inner rod 5*b*-3 is axially movable relative to the outer stem 5*b*-4. The inner rod 5*b*-3 and the outer stem 5*b*-4 are arranged to extend into an opening 5*a*-1 of the base bracket assembly 5*a*, shown in FIG. 6. As shown in more detail in FIG. 5, the exemplified locking mechanism 7 comprises a resilient element 7*a*, such as a spring, arranged around the inner rod 5*b*--2 and a spring-loaded element 7*b*. The resilient element 7*a* biases the spring-loaded element 7*b* towards a counter surface 7*c* of the base bracket assembly 5*a*, for example a bevelled surface, such that the spring-loaded element 7*b* engages with the base bracket assembly 5*a* and axially locks the first harness holder 5*b* to the base bracket assembly 5*a*. The pulling handle 5*f* also forms part of the locking mechanism 7. The pulling handle 5*f* forms an upper or top end of the first harness holder 5*b*. When pulled upwards in the direction of the arrow B along a longitudinal axis C of the first harness holder 5*b*, the inner rod 5*b*-*c* is initially moved axially upwards relative to the outer stem 5*b*-4 and thus the resilient member 7*a* is compressed towards a radial surface of the outer stem 5*b*-4 and the spring tension provided by the resilient element 7*a* on the spring-loaded element 7*b* decreases and the spring-loaded element 7*b* disengages from the base bracket assembly 5*a*. Eventually, during the operation of pulling out the first harness holder 5*b* from the base bracket assembly 5*a*, the inner rod 5*b*-3 will axially engage with the outer stem 5*b*-4 and they will move together in the direction of the arrow B. The spring-loaded element 7*b* may be arranged pivotable on the first harness holder 3*b*, for example on the outer stem 5*a*-4, wherein when the spring tension decreases, the spring-loaded element 7*b* pivots away from the counter surface 7*c* thus causing the first harness holder 3*b* to disengage from the base bracket assembly 3*a*. When no pulling force acts on the pulling handle 3*f*, the spring-loaded element 7*b* is pivoted towards the counter surface 7*c* by the force provided by the resilient member 7*a* locking the first harness holder 3*b* to the base bracket assembly 3*a*.

The harness connector arm 2 may comprise openings 8 configured to receive respective fasteners, such as shoulder bolts or screws, to thereby rotationally fix or release the harness connector arm 2 from the outer stem 5*b*-4, to set the rotational position of the harness connector arm 2 relative to the outer stem 5*b*-4 as will be explained in more detail with reference to FIG. 12.

Figure 6:
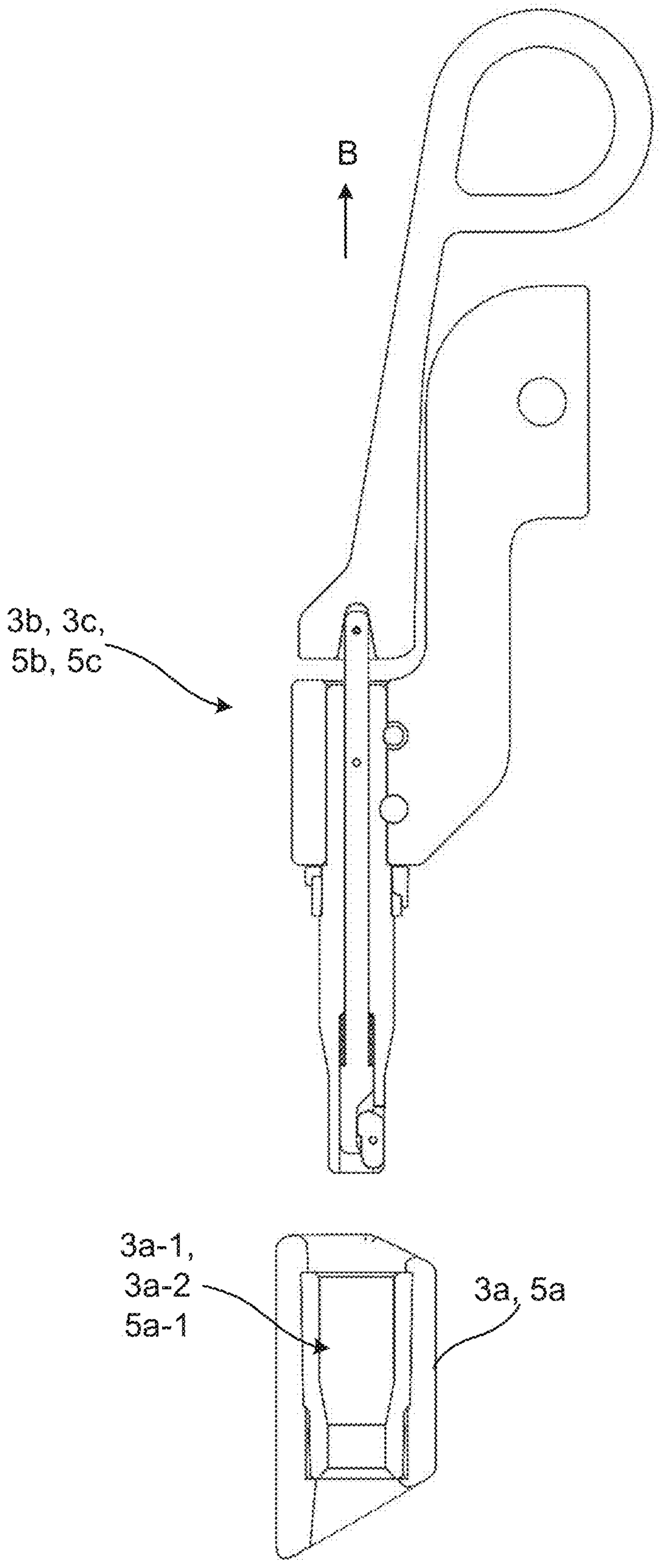
FIG. 6 shows a harness holder when removed from the base bracket assembly.

FIG. 6 shows the harness holder 3*b*, 3*c*, 5*b*, 5*c* when it has been completely removed from the base bracket assembly 3*a*, 5*a*.

Figure 7:
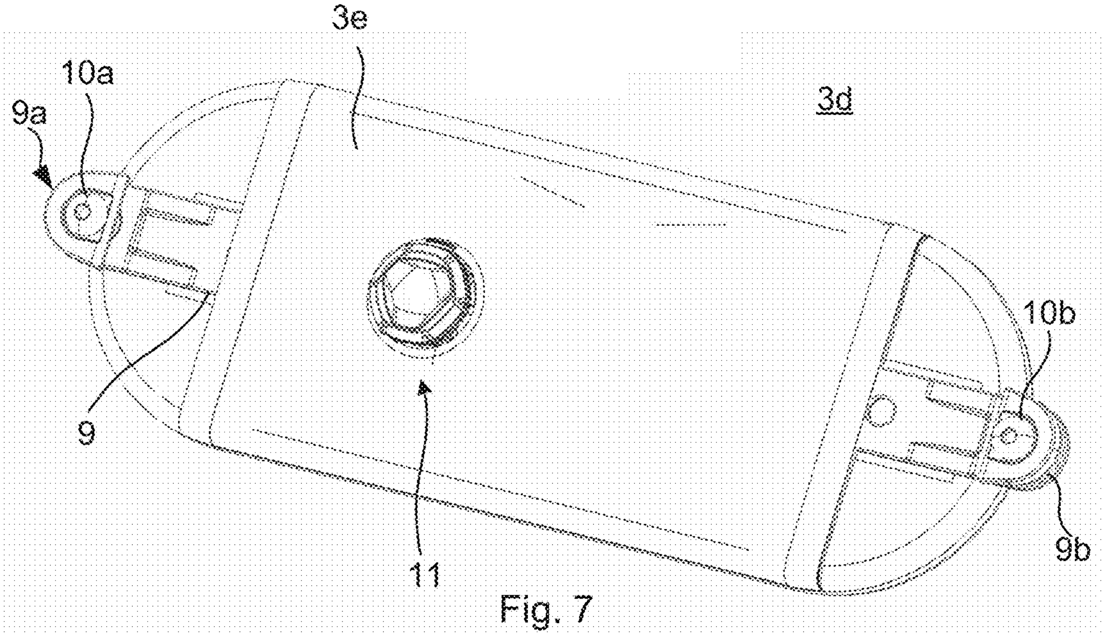
FIG. 7 is a perspective view of an example of a flexible harness.

FIG. 7 shows a perspective view of the flexible harness 3*d*. The flexible harness 3*d* has a knee-facing side (or a first side or an inner side) arranged to bear against the knee of a user, and an outer side (or a second side).

The flexible harness 3*d* comprises a connection strap 9. The connection strap 9 is configured to be connected to the first harness holder 3*b* and the second harness holder 3*c*. The connection strap 9 has a first outer end 9*a* and a second outer end 9*b* opposite to the first end 9*a*. The flexible harness 3*d* may have an elongated shape, extending from the first outer end 9*a* to the second outer end 9*b* of the connection strap 9.

The flexible harness 3*d* may comprise connection elements 10*a*, 10*b*, such as screws, for releasably connecting the connection strap 9 and thus the flexible harness 3*d* to the first harness holder 3*b* and the second harness holder 3*c*, respectively, in a pivotable way.

The exemplified flexible harness 3*d* comprises an external knob 11 (also referred to as a tension adjustment member 11). The external knob 11 is provided on the outer side of the flexible harness 3*d*. The external knob 11 forms part of a user-adjustable adjustment system configured to adjust the size/tightness of the flexible harness 3*d*.

Figure 8A:
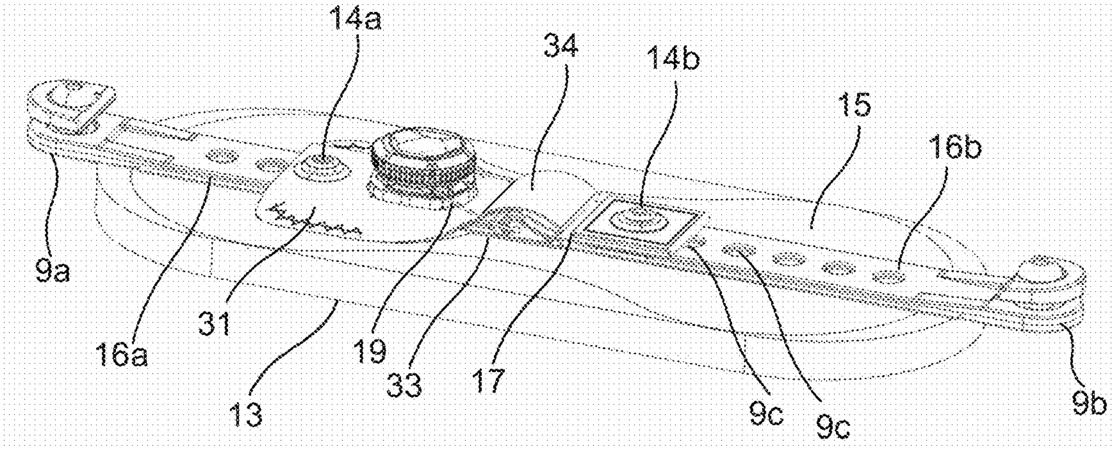
FIG. 8A shows a perspective view of the flexible harness in FIG. 7 with its outer cover removed.

FIG. 8A shows the flexible harness 3*d* without its outer cover 3*e*. The flexible harness 3*d* may comprise a padding 13, for example a foam filling. When the flexible harness 3*d* is attached to the first harness holder 3*b* and the second harness holder 3*c* the flexible harness 3*d* obtains a curved state in which the outer side of the flexible harness 3*d* provided with the external knob 11 bulges outwards. The padding 13 is arranged on the knee-facing side of the flexible harness 3*d*. The padding 13 thus faces the knee of a user when the knee support assembly 1 is in use.

The flexible harness 3*d* comprises a substrate 15 onto which the connection strap 9 is mounted. The substrate 15 may be stiff or rigid. The substrate may for example be made of a polymeric, metal, or a composite material. In the illustrated example of an embodiment, the substrate 15 is formed of high-density polyethylene (HDPE). The padding 13 may be mounted to the substrate 15. The padding 13 can be formed of a foam material, or any other suitable cushioning material providing directed structural support to a user. In the illustrated example of an embodiment, the padding 13 is formed of acrylonitrile butadiene rubber (NBR).

Figure 8B:
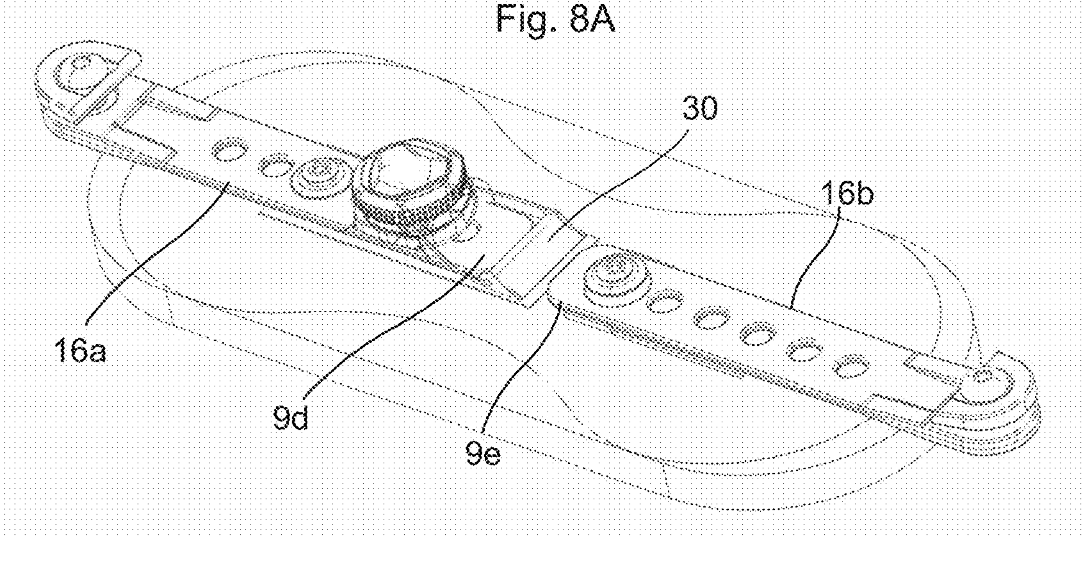
FIG. 8B shows a perspective view of the flexible harness in FIG. 8A with a cover portion, a second strap portion, and a third strap removed for clarity.

As better seen in FIGS. 8A-8B, the connection strap 9 may be made of a plurality of straps 16*a* and 16*b* (or strap pieces 16*a*, 16*b*). More specifically, the connection strap 9 can include a first strap 16*a* spaced from a second strap 16*b*. The first and second straps 16*a*, 16*b* can be formed of a polyurethane thermoplastic elastomer (TPU). A third strap 17 (shown in FIG. 8A) extends between the first and second straps 16*a*, 16*b*. The third strap 17 extends between the first and second straps 16*a*, 16*b*. More specifically, the third strap 17 respectively connects to the first strap 16*a* and the second strap 16*b*. As such, the third strap 17 bridges the first and second straps 16*a*, 16*b*. The third strap 17 can be formed of a polyester woven webbing.

The third strap 17 includes a first strap portion 33 (also referred to as an elastic strap portion 33) and a second strap portion 34 (also referred to as a safety strap 34). The first strap portion 33 is configured to have elasticity, such that the first strap portion 33 is configured to expand and contract during operation of the connection strap 9 discussed herein. The second strap portion 34 is configured to be nonelastic, or generally rigid, such that the second strap portion 34 does not expand and contract during operation of the connection strap 9. Stated another way, the first strap portion 33 has greater elasticity relative to the second strap portion 34.

The third strap 17 is in engagement with a sled member 30 (also referred to as a sliding member 30 or a strap adjustment member 30). The sled member 30 defines an aperture that receives a cable 19. The cable 19 extends from the tension adjustment member 11, through the aperture defined by the sled member 30, and back to the tension adjustment member 11. Thus, the cable 19 is operably connected to the tension adjustment member 11, which is discussed in additional detail below. The tension member 11 can be attached to the first strap 16*a*. In other examples of embodiments, the tension member 11 can be attached to a cover portion 31. The cover portion can be coupled to the substrate 15, and further can be coupled to the first strap 16*a*.

Figure 8C:
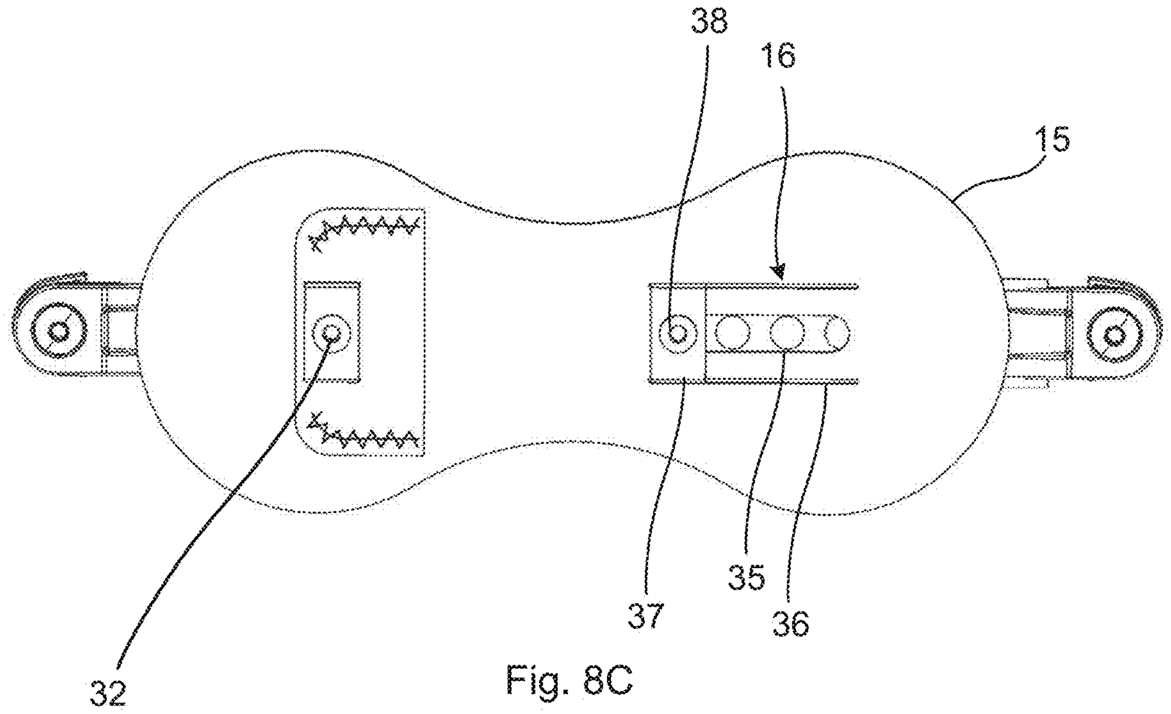
FIG. 8C is a front view of an example of an embodiment of an underside of the substrate of the flexible harness in FIG. 7 without padding.

In the illustrated embodiment, the connection strap 9 and associated user-adjustable adjustment system can include a first size adjustment assembly and a second size adjustment assembly. The first size adjustment assembly can also be referred to as a course size adjustment system. With reference to FIG. 8A, in the first size adjustment assembly the first strap 16*a* is fastened (or fixed) relative to the substrate 15. More specifically, the first strap 16*a* can include a plurality of through openings 9*c* (also referred to as apertures 9*c*). A corresponding opening 32 can be defined by the substrate 15 (shown in FIG. 8C). A fastener 14*a* (e.g., a bolt, a screw, a barrel screw and nut, etc.) can be received by aligned openings 9*c*, 32 to fasten the first strap 16*a* to the substrate 15. It should be appreciated that the first strap 16*a* can be configured to slide (or slidably fastened or be repositioned) relative to the substrate 15 to facilitate adjustability of the positioned of the first strap 16*a* relative to the substrate 15.

Figure 8D:
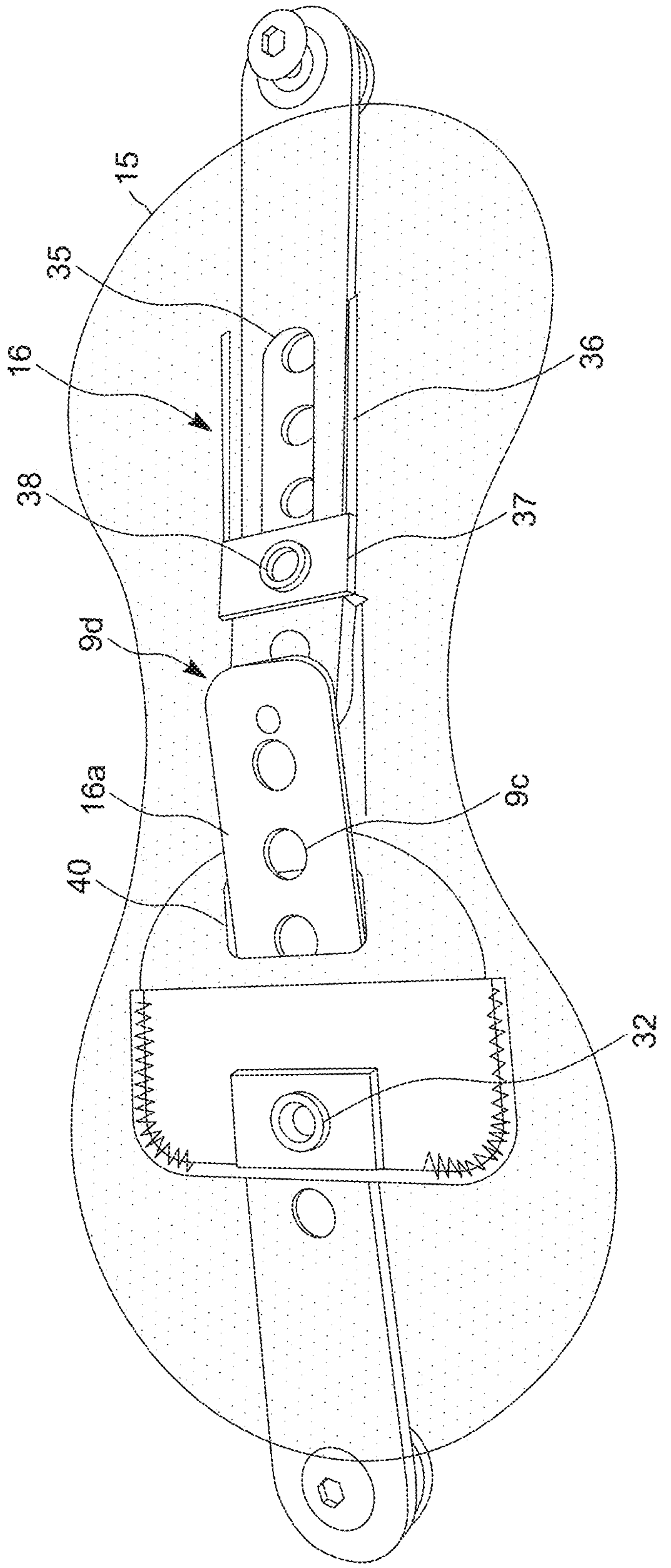
FIG. 8D is a perspective view of another example of an embodiment of the underside of the substrate of the flexible harness in FIG. 7 without padding illustrating an aperture through the substrate configured to receive a portion of a first strap.

With reference to FIG. 8D, in another example of an embodiment, the substrate 15 can define an aperture 40 (or a window 40 or a slot 40) through the substrate 15. The aperture can be positioned between the opening 32 and an elongated slot 35, which is discussed further below. The aperture can receive a portion of the first strap 16*a*, such as an end portion of the first strap 16*a*, to allow the first strap 16*a* to extend from the outer side (or second side) of the substrate 15 to the inner side (or first side) of the substrate 15. This allows for repositioning of the first strap 16*a* relative to the substrate 15 without an inner end 9*d* of the first strap 16*a* contacting the second strap 16*b*. Stated another way, as the first strap 16*a* is positioned (or repositioned) relative to the substrate 15, the portion of the first strap 16*a* received by the aperture 40 (e.g., the inner end 9*d*) is directed from the second side to opposite first side to facilitate unobstructed adjustment between the first and second straps 16*a*, 16*b*.

The second strap 16*b* can be configured to slide (or slidably fastened or be repositioned) relative to the substrate 15. The second strap 16*b* can include a plurality of through openings 9*c*. The second strap 16*b* is configured to slide relative to the substrate 15. Once slidably adjusted to a desired position, one or more openings 9*c* of the second strap 16*b* is aligned at a desired position of a slot assembly 16. The slot assembly 16 is defined by the substrate 15 (shown in FIG. 8C). The slot assembly 16 can includes the elongated slot 35 that extends through the substrate 15. The slot assembly 16 can also include a pair of secondary slots 36, which are arranged in parallel and positioned on opposing sides of the elongated slot 35. The secondary slots 36 can serve as a track (or a guide) to a hub 37 that defines an aperture 38. Thus, the hub 37 can be repositioned (or slide) along the secondary slots 36 to align with one of the openings 9*c* of the second strap 16*b*. A fastener 14*b* (e.g., a bolt, a screw, a barrel screw and nut, etc.) can be received by the aligned opening 9*c*, slot 35, and aperture 38 to selectively fasten the second strap 16*b* to the substrate 15. In addition, sliding of the second strap 16*b* relative to substrate 15 to a position closer or further away from the first strap 16*a* adjusts the distance between facing inner ends 9*d* and 9*e* of the two straps 16*a*, 16*b*. This in turn adjusts the distance between the two outer ends 9*a* and 9*b*. Accordingly, this adjusts the size of the flexible harness 3*d* by adjusting a length of the connection strap 9 to accommodate user knees and legs of different shapes and sizes.

Figure 9A:
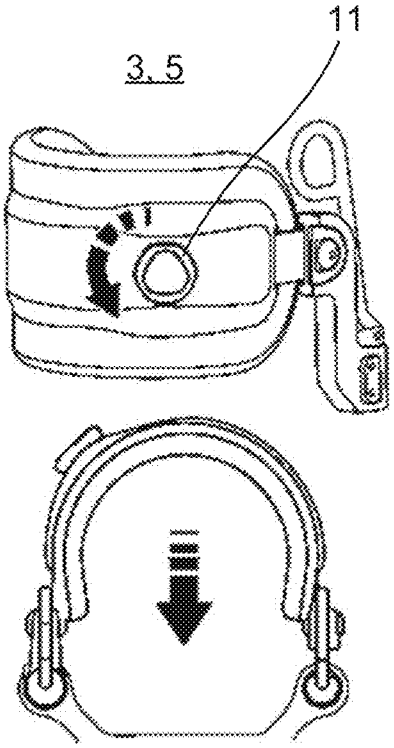
FIG. 9A is a perspective and a top view of a knee support being tightened.

With continued reference to FIG. 8A, the second size adjustment assembly includes the tension adjustment member 11 operably connected to the third strap 17 by the cable 19 (also referred to as a wire 19 or a lace 19). The second size adjustment assembly can also be referred to as a fine size adjustment system. In operation, rotation of the tension adjustment member 11 in a first direction is configured to decrease an exposed length of the cable 19 (or retract the cable 19). As the tension adjustment member 11 is rotated, the cable 19 is incrementally wound onto the tension adjustment member 11. By decreasing the exposed length of the cable 19, tension applied to the cable 19 is increased. In turn, the distance between facing inner ends 9*d*, 9*e* of the first and second straps 16*a*, 16*b* incrementally decreases (shown in FIG. 8B). More specifically, as the exposed length of cable 19 decreases, the sled member 30 slides towards the first strap 16*a* (or towards the tension adjustment member 11). As the sled member 30 slides, the third strap 17 and the second strap 16*b* are drawn closer to the first strap 16*a*. This results in tightening of the flexible harness 3*d*. FIG. 9A illustrates a perspective view and a top view of the knee support 3, 5, when the flexible harness 3*d* is tightened by rotation of the tension adjustment member 11. The tension adjustment member 11 is configured to be rotated until a desired tightness of the flexible harness 3*d* is achieved of the user.

Figure 9B:
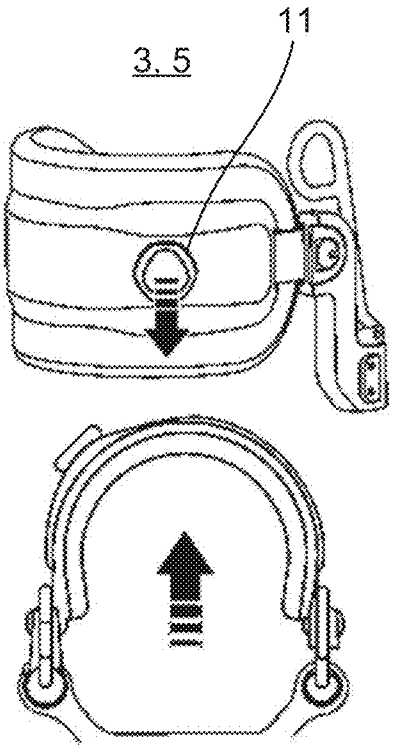
FIG. 9B is a perspective view and a top view of a knee support being untightened.

With reference back to FIG. 8A, movement of the tension adjustment member 11 in a second direction is configured to increase an exposed length of the cable 19, loosening the flexible harness 3*d*. In the illustrated embodiment, the tension adjustment member 11 is configured to translate (or slide) along an axis of rotation of the tension adjustment member 11. Stated another way, the tension adjustment member 11 is configured to slide away from the first strap 16*a* (or the cover portion 31). As the tension adjustment member 11 is moved in this second direction, the cable 19 is released from the tension adjustment member 11. This increases the exposed length of the cable 19 (or extends the cable 19), and decreases the tension applied to the cable 19. The sled member 30 slides away from the first strap 16*a* (or away from the tension adjustment member 11). As the sled member 30 slides, the third strap 17 and the second strap 16*b* move away from the first strap 16*a*. This results in loosening of the flexible harness 3*d*. FIG. 9B illustrates a perspective view and a top view of the knee support 3, 5, when the flexible harness 3*d* is loosened in response to the tension adjustment member 11 sliding in the second direction. In other examples of embodiments, the second direction of the tension adjustment member 11 can include rotation of the tension adjustment member 11 in a direction opposite the first direction.

It should be appreciated that in addition to facilitating fine size adjustment of the flexible harness 3*d*, the third strap 17 can provide some safety functionality for a user of the flexible harness 3*d*. In one aspect, the elasticity of the first strap portion 33 of the third strap 17 provides some resilience to the flexible harness 3*d* in a situation where the cable 19 is loosened such that an exposed length of the cable 19 does not provide any support to a user's leg positioned in the flexible harness 3*d*. In this situation, the elasticity of the first strap portion 33 contracts, allowing the third strap 17 to draw the first and second straps 16*a*, 16*b* towards each other. This provides sufficient elasticity such that the flexible harness 3*d* obtains a curved state and the associated padding 13 provides a minimal amount of support to the leg of the user.

In another aspect, in an unlikely situation of a failure of the cable 19, the second strap portion 34 of the third strap 17 includes an excess length of strap material relative to a length of the first strap portion 33. As such, the second strap portion 34 has a length that is greater than a length of the first strap portion 33. The second strap portion 34 is generally in a folded configuration, as shown in FIG. 8A, to store the additional length of strap material. In addition, as previously noted, the second strap portion 34 is generally less elastic, or generally more rigid, relative to the elastic first strap portion 33. Should the cable 19 fail, resulting in the first and second straps 16*a*, 16*b* traveling away from each other, the second strap portion 34 of the third strap 17 transitions from a first configuration, where the second strap portion 34 is folded, to a second configuration, where the second strap portion 34 is deployed (or extended). The second strap portion 34 provides a rigid connection between the first and second straps 16*a*, 16*b*, stopping further movement of the straps 16*a*, 16*b* away from each other. As such, the second strap portion 34 maintains a connection between the straps 16*a*, 16*b* should the cable 19 fail, and further assist with maintaining a position of the leg of the user within the flexible harness 3*d*, reducing the risk of a user inadvertently not being supported by the flexible harness 3*d*. Stated another way, the second strap portion 34 can limit a risk of a user's leg becoming unsupported by the flexible harness 3*d* in response to a failure of the cable 19.

Figure 10:
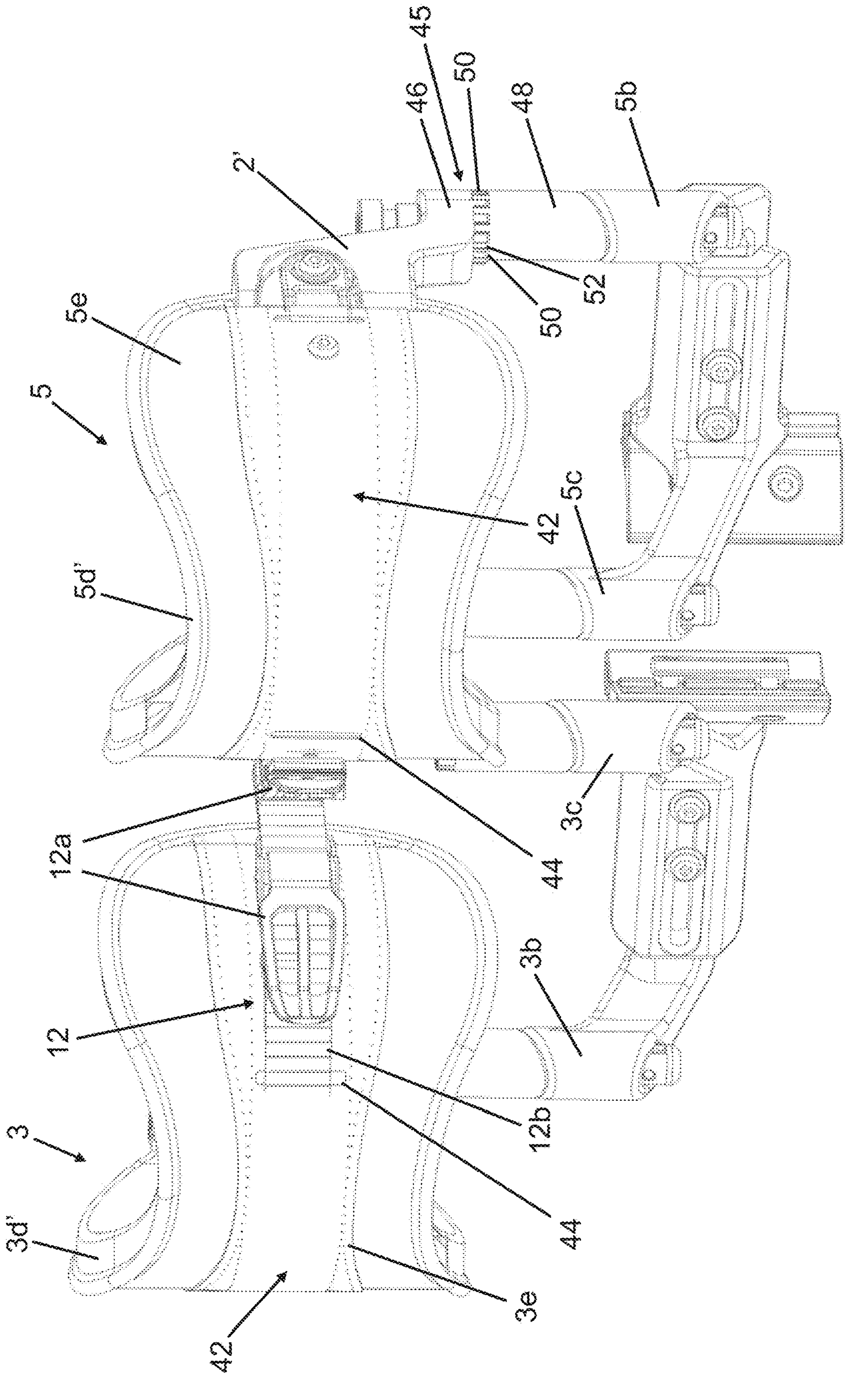
FIG. 10 shows an example of a variation of the knee support assembly illustrating an alternative binding system including an adjustable buckle and strap portion, the strap portion is omitted from the second knee support for clarity.

With reference now to FIG. 10, another example of an embodiment of the flexible harness 3*d*', 5*d*' can include a binding system 12 for the user-adjustable adjustment system. The binding system 12 can include an adjustable buckle 12*a*, such as a ratchet buckle (or a ratchet strap). The ratchet buckle 12*a* can replace the tension adjustment member 11, or be provided in addition to the tension adjustment member 11. The binding system 12 may be provided on the outside (or exterior) of the flexible harness 3*d*', 5*d*'. The binding system 12 can provide course adjustment by sliding a strap portion 12*b* into engagement with the ratchet buckle 12*a*. Fine adjustment can be provided by actuating the ratchet buckle 12*a* to incrementally draw the strap portion 12*b* towards the ratchet buckle 12*a*, tightening the flexible harness 3*d*', 5*d*'. To loosen the strap portion 12*b*, the ratchet buckle 12*a* can be actuated (or pivotably moved relative to the strap portions 12*b*) to release the strap portion 12*b* from the ratchet buckle 12*a*. In the illustrated embodiment, the strap portion 12*b* is partially received by a channel 42 defined by the padded outer cover 3*c*, 5*e*. A first portion of the strap portion 12*b* is received by the channel 42 within the padded outer cover 3*e*, 5*e*, while a second portion of the strap portion 12*b* extends through an aperture 44 in the padded outer cover 3*e*, 5*e*. The second portion of the strap portion 12*b* is configured to engage the ratchet buckle 12*a*.

Figure 11:
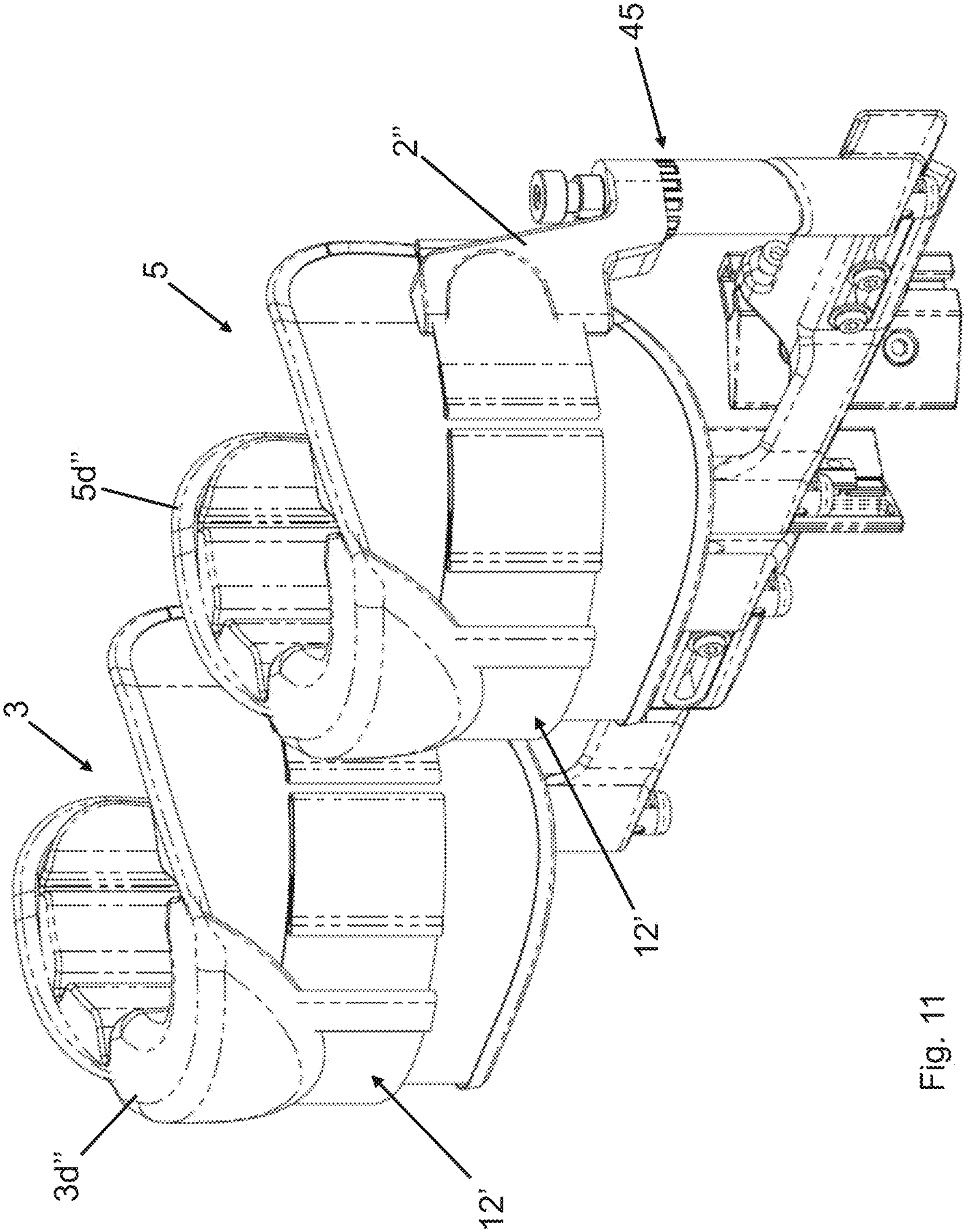
FIG. 11 depicts another example of a variation of the knee support assembly.

With reference now to FIG. 11. Another example of an embodiment of the flexible harness 3*d*", 5*d*" is illustrated. The flexible harness 3*d*", 5*d*" includes a tightening strap 12'. The tightening strap is configured to engage opposing harness connector arms 2". The strap 12' includes a hook and loop structure to facilitate a self-connection of the strap. For example, a first portion of the strap 12' can include a hook portion, and a second portion of the strap 12" can include a loop portion. The strap 12' can be tightened (or loosened) to a desired position. The hook portion can then be positioned into engagement with the loop portion, fastening the strap 12' to a desired position (a desired tightness or a desired looseness).

Figure 12:
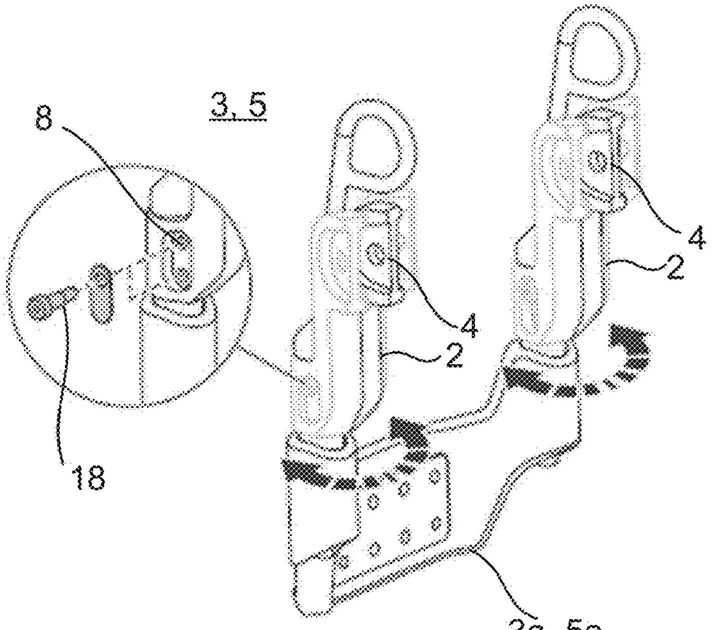
FIG. 12 shows a perspective view of a knee support and how it can accommodate different leg sizes and positions.

With reference to FIG. 12, the rotational position of the harness connector arm 2 of the first harness holder 3*b*, 5*b* and/or the second harness holder 3*c*, 5*c* relative to the base bracket assembly 3*a*, 5*a* to which the harness holders 3*b*, 3*c*, 5*b*, 5*c* are connected, and relative to the respective outer stem 5*b*-4, may according to one example be adjusted. The harness connector arms 2 may be configured to be rotatable relative to the outer stem 5*b*-4, i.e., the lower portion of the harness holder 3*b*, 3*c*, 5*b*, 5*c* received in the base bracket assembly 3*a*, 5*a*. The harness connector arms 2 may be released from a fixed connection with a lower portion of the respective harness holder 3*b*, 3*c*, 5*b*, 5*c* such that each harness connector arm 2 can be rotated laterally inwards or outwards. Thereby, the pair of harness connector arms 2 of the flexible harness 3*d* can be rotated towards each other to reduce the distance between connection points 4 of the respective harness connector arm 2, or away from each other, to increase the distance between the connection points 4. Different knee and leg sizes may thus be accommodated. Additionally, both harness connector arms 2 may be rotated in the same direction to address the user's needs or desire for leg positioning, e.g., for users with non-symmetrical posture. In the disclosed example, the harness connector arm 2 is secured to the desired angular positions using a shoulder bolt 18 being fixed to one of a plurality of angle setting positions on the harness connector arm 2. In another example, shown in FIG. 10, each harness connector arm 2' includes an interlocking connection assembly 45 that allows a first connector arm portion 46 to be selectively rotated relative to a second connector arm portion 48 to a adjust rotational position of the harness connector arm 2'. To form the interlocking connection assembly 45, the first connector arm portion 46 defines a first plurality of teeth 50, while the second arm portion 48 defines a second plurality of teeth 52. The arm portions 46, 48 are configured to form a meshed connection, with the first and second plurality of teeth 50, 52 interlocking. In an example of an embodiment, the interlocking meshed connection can be a Hirth-type coupling. The meshed connection can facilitate selective rotational adjustment of the first connector arm portion 46 relative to the second connector arm portion 48. For example, the first connector arm portion 46 can be rotated laterally inwards or outwards, or relative to an axis defined by the arm portions 46, 48 (or longitudinal axis C, shown in FIG. 4). In another example, shown in FIG. 11, each harness connector arm 2" also can include the interlocking connection assembly 45 and associated components.

Each flexible harness 3*d*, 5*d*, 3*d*', 5*d*', 3*d*", 5*d*" is arranged in front of the respective connection points 4, in a forward direction from the base bracket assembly 3*a*, 5*a* towards the flexible harness 3*d*, 5*d*. This means that the pivot connections of the connection points 4 and the connection elements 9*a*, 9*b* of the flexible harness 3*d*, 5*d* are arranged behind the knee joint when the knee support assembly 1 is in use. The flexible harness 3*d*, 5*d* will therefore better follow any movement of a knee.

Figure 13:
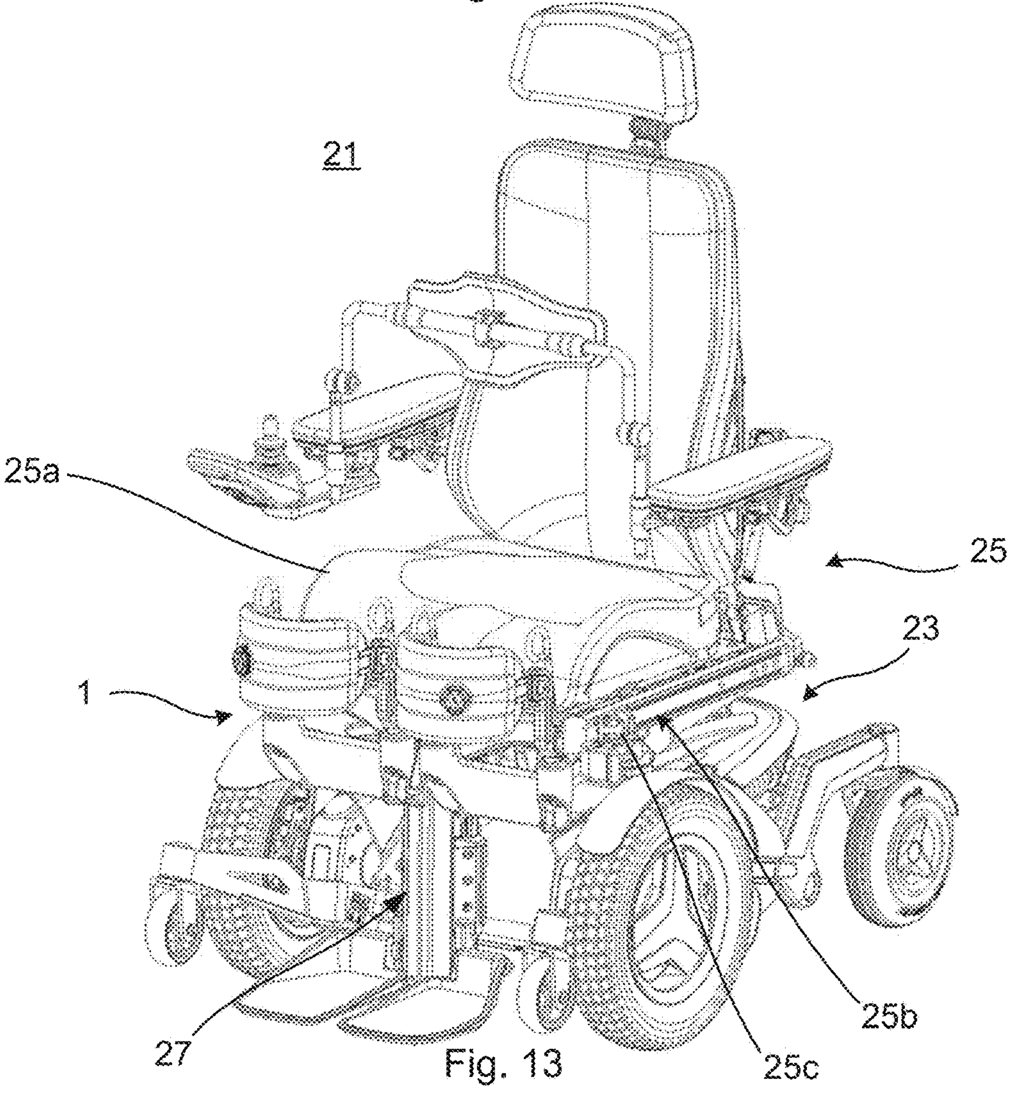
FIG. 13 is an example of a wheelchair comprising the knee support assembly.

With reference to FIG. 13, an example of a wheelchair 21 is shown. The wheelchair 21 is according to the example a power wheelchair but could alternatively be a manual wheelchair.

The exemplified wheelchair 21 comprises a chassis 23 and a seating system 25 comprising a seat 25*a*, attached to the chassis 23. The wheelchair 21 comprises a leg rest assembly 27 attached to the chassis 23 or to the seating system 25. The seating system 25 may have forward tilting and/or standing capability, for example by means of motor control. The seat 25*a* may thus according to one example be able to be tilted slightly forward, such that the user attains a forward leaning position, or according to another example, it may be tilted significantly forward, such that the user attains an essentially vertical stand position.

The wheelchair 21 comprises the knee support system 1. The knee support system 1 is according to the example attached to the leg rest assembly 27. For example, each base bracket assembly 3*a*, 5*a* e.g., by means of the rail structure 3*k*, may be attached to the leg rest assembly 27. In another example, the leg rest assembly 27 comprises a leg rest rail structure (not shown) for mounting of the knee support system 1, such that the knee support system 1 can be mounted to the leg rest assembly 27 at different vertical positions along the leg rest assembly 27.

The seating system 25 may comprise two laterally arranged rail structures 25*b*, one at each side of the seat 25*a*.

Figure 14:
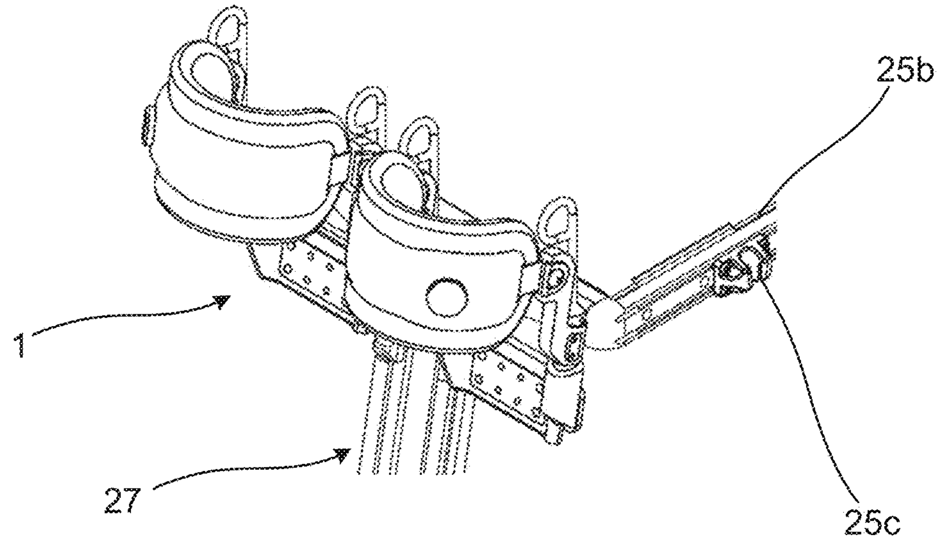
FIG. 14 is a perspective view of a knee support assembly attached to a leg rest assembly.

The seating system 25 may comprise anchoring members 25*c*, each anchoring member 25*c* being attached to a respective one of the two lateral rail structures 25*a*. Each first, or inner, first harness holder 3*b*, 5*b* is configured to be releasably attached to a respective one of the anchoring members 25*c*. In the disclosed example, the anchoring members 25 are free of any locking arrangements, and the harness holder 3*b*, 5*b* is simply introduced into the anchoring members from above and kept in place by gravity. The lateral rail structure 25*b* is shown in somewhat more detail in FIG. 14.

In another example, the anchoring member may be provided with locking features, for example by means of a locking mechanism such as locking mechanism 7. Then, the anchoring members 25*c* may have the same or similar design as the base bracket assembly 3*a*, 5*a* for axially interlocking with the second harness holders 3*c*, 5*c*.

Figure 15:
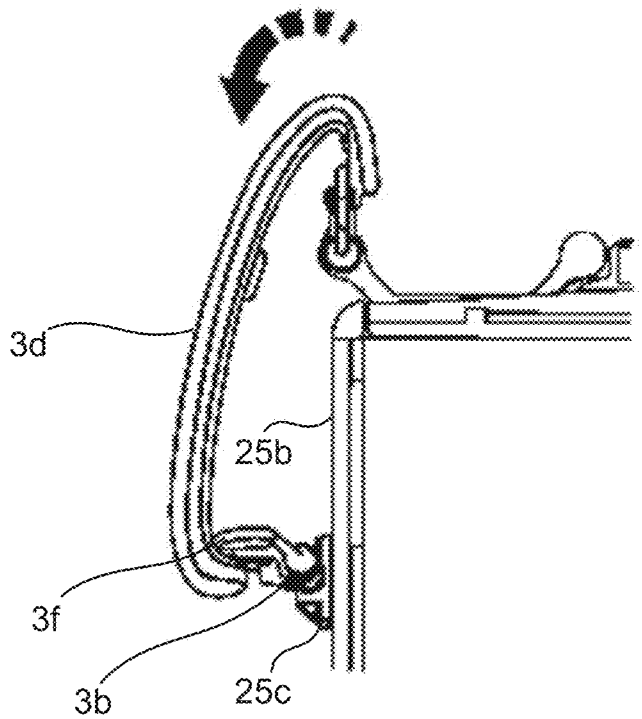
FIG. 15 shows a top view of a harness holder and the flexible harness in a parked position.

FIG. 15 is top view of an example of the first knee support 3 when the first flexible harness 3*d* and the inner, or first, harness holder 3*c*, has been arranged in a parked position after the first harness holders 3*c* has been disengaged and removed from the base bracket assembly 3*a* and the flexible harness 3*d* has been moved outwards and been attached to the anchoring member 25*c* arranged adjacent to the first knee support 3.

The inventive concept has mainly been described above with reference to a few examples. However, as is readily appreciated by a person skilled in the art, other embodiments than the ones disclosed above are equally possible within the scope of the inventive concept, as defined by the appended claims.

What is claimed is:

1. A knee support assembly for a wheelchair, comprising:

a knee support configured to be mounted to the wheelchair, the knee support including:

a flexible harness connected to and pivotably suspended between a first harness holder and a second harness holder, the flexible harness includes;

a first strap, a second strap, and a substrate, the first strap is selectively fastened to the substrate, and the second strap is selectively fastened to the substrate, the first strap and the second strap each being configured to slide relative to the substrate;

a tension adjustment member coupled to the first strap;

a third strap coupled to the first strap and the second strap; and a cable extending from the tension adjustment member to engage the third strap.

2. The knee support assembly of claim 1, wherein, the substrate defines an elongated slot, and an aperture is defined by the second strap, a fastener is received by the aligned aperture and slot.

3. The knee support assembly of claim 2, wherein the substrate defines at least one secondary slot configured to guide a hub, the hub defines an aperture, the fastener is configured to be received by the aligned aperture, slot, and aperture.

4. The knee support assembly of claim 1, further comprising a sled member in engagement with the third strap, the cable being received by an aperture defined by the sled member.

5. The knee support assembly of claim 4, wherein in response to rotation of the tension adjustment member in a first direction, the cable is retracted, and the sled member slides the second strap and the third strap towards the first strap.

6. The knee support assembly of claim 4, wherein the flexible harness tightens in response to rotation of the tension adjustment member in a first direction.

7. The knee support assembly of claim 5, wherein in response to movement of the tension adjustment member in a second direction, the cable is extended, and the sled member slides the second strap and the third strap away from the first strap.

8. The knee support assembly of claim 7, wherein the second direction is along an axis of rotation of the tension adjustment member.

9. The knee support assembly of claim 7, wherein the flexible harness loosens in response to movement of the tension adjustment member in the second direction.

10. The knee support assembly of claim 1, wherein the third strap includes a first strap portion and a second strap portion, the second strap portion having a length longer than the first strap portion.

11. The knee support assembly of claim 10, wherein the first strap portion has a greater elasticity than the second strap portion.

12. The knee support assembly of claim 10, wherein the second strap portion is configured to transition from a first folded configuration to a second deployed configuration in response to a failure of the cable.

13. A knee support assembly for a wheelchair, comprising:

a knee support configured to be mounted to the wheelchair, the knee support including:

a flexible harness connected to and pivotably suspended between a first harness holder and a second harness holder, a base bracket assembly configured to be mounted to the wheelchair, the first harness holder having a lower portion connected to the base bracket assembly at a first lateral side of the base bracket assembly, and the second harness holder having a lower portion connected to the base bracket assembly at a second lateral side of the base bracket assembly, wherein the flexible harness includes a first strap, a tension adjustment member, and a substrate, the first strap is selectively fastened to the substrate, and the tension adjustment member is selectively fastened to the substrate, the first strap being configured to slide relative to the substrate in response to actuation of the tension adjustment member.

14. The knee support assembly as claimed in claim 13, wherein at least one of the first harness holder and the second harness holder is releasably connected to the base bracket assembly, to enable moving the flexible harness to the side relative to the base bracket assembly and thereby allow placement or removal of a leg between the base bracket assembly and the flexible harness.

15. The knee support assembly of claim 14, wherein the at least one of the first harness holder and the second harness holder that is releasably connected to the base bracket assembly includes a locking mechanism configured to releasably lock said harness holder to the base bracket assembly.

16. The knee support assembly as claimed in claim 13, wherein the tension adjustment member is a ratchet buckle.

17. A knee support assembly for a wheelchair, comprising:

a knee support including:

a flexible harness connected to and extending between a first harness holder and a second harness holder, wherein the flexible harness is arranged to provide knee support, wherein the flexible harness includes a first strap and a second strap, each fastened to a substrate, a tension adjustment member coupled to the first strap, a third strap coupled to the first strap and the second strap, a sled member in engagement with the third strap, and a cable extending from the tension adjustment member and received by an aperture defined by the sled member.

18. The knee support assembly of claim 17, wherein in response to rotation of the tension adjustment member in a first direction, the cable is retracted, and the sled member slides the second strap and the third strap towards the first strap.

19. The knee support assembly of claim 18, wherein in response to movement of the tension adjustment member in a second direction, the cable is extended, and the sled member slides the second strap and the third strap away from the first strap.

20. The knee support assembly of claim 17, further comprising:

a base bracket assembly configured to be mounted to the wheelchair, the first harness holder having a lower portion connected to the base bracket assembly at a first lateral side of the base bracket assembly, and the second harness holder having a lower portion connected to the base bracket assembly at a second lateral side of the base bracket assembly, wherein at least one of the first harness holder and the second harness holder is releasably connected to the base bracket assembly, to enable moving the flexible harness to the side relative to the base bracket assembly and thereby allow placement or removal of a leg between the base bracket assembly and the flexible harness.

* * * * *